United States Patent [19]

Hayward

[11] Patent Number: 5,236,131
[45] Date of Patent: Aug. 17, 1993

[54] VEHICLE FOR DISTRIBUTING LIQUID OVER THE GROUND

[76] Inventor: Richard G. Hayward, Kingston House, Kingston, Wareham, Dorset BH20 5LQ, United Kingdom

[21] Appl. No.: 824,936

[22] Filed: Jan. 24, 1992

[30] Foreign Application Priority Data

Jan. 24, 1991 [GB] United Kingdom ............... 9101578
Apr. 19, 1991 [GB] United Kingdom ............... 9108454

[51] Int. Cl.⁵ .......................................... B05B 3/18
[52] U.S. Cl. .......................... 239/745; 239/747; 137/355.12; 137/355.27
[58] Field of Search ..................... 239/743-749, 239/195, 197, 198; 137/355.12, 355.2, 355.27, 355.28

[56] References Cited

U.S. PATENT DOCUMENTS

| | | | |
|---|---|---|---|
| 2,540,556 | 2/1951 | Salatin | 239/197 |
| 2,683,056 | 7/1954 | Hilfinger | 239/197 |
| 3,687,372 | 8/1972 | Badcock | 239/747 |
| 4,254,912 | 3/1981 | Lebrun et al. | 239/748 |
| 4,346,842 | 8/1982 | Botha | 239/748 |

FOREIGN PATENT DOCUMENTS

| | | | |
|---|---|---|---|
| 0559493 | 8/1983 | Australia. | |
| 75703 | 9/1893 | Fed. Rep. of Germany. | |
| 2207049 | 5/1973 | Fed. Rep. of Germany | 239/745 |
| 2538672 | 7/1984 | France | 239/747 |
| 2627662 | 9/1989 | France. | |
| 2645704 | 10/1990 | France. | |

Primary Examiner—Andres Kashnikow
Assistant Examiner—Karen B. Merritt
Attorney, Agent, or Firm—D. Peter Hochberg; Mark Kusner

[57] ABSTRACT

A wheeled vehicle carries a reel 3 on to which part of a long length of hose may be coiled, with the end of the hose coupled to a hose connection 10 which conveys water to a hollow axle 7 about which the reel 3 rotates and through a swivel coupling 12 to a hollow shaft 13 from which the water flows through shorter hoses 16, mounted on long arms 14, to nozzles 17. Passage of the water from the nozzles causes the arms 14 to rotate about a vertical or nearly vertical axis and this rotation is transmitted to the reel 3 which rotates. Rotation of the reel 3, which is preferably disposed with its axis vertical, causes more of the hose to become coiled on the reel and this in turn causes the vehicle to move along the ground.

15 Claims, 10 Drawing Sheets

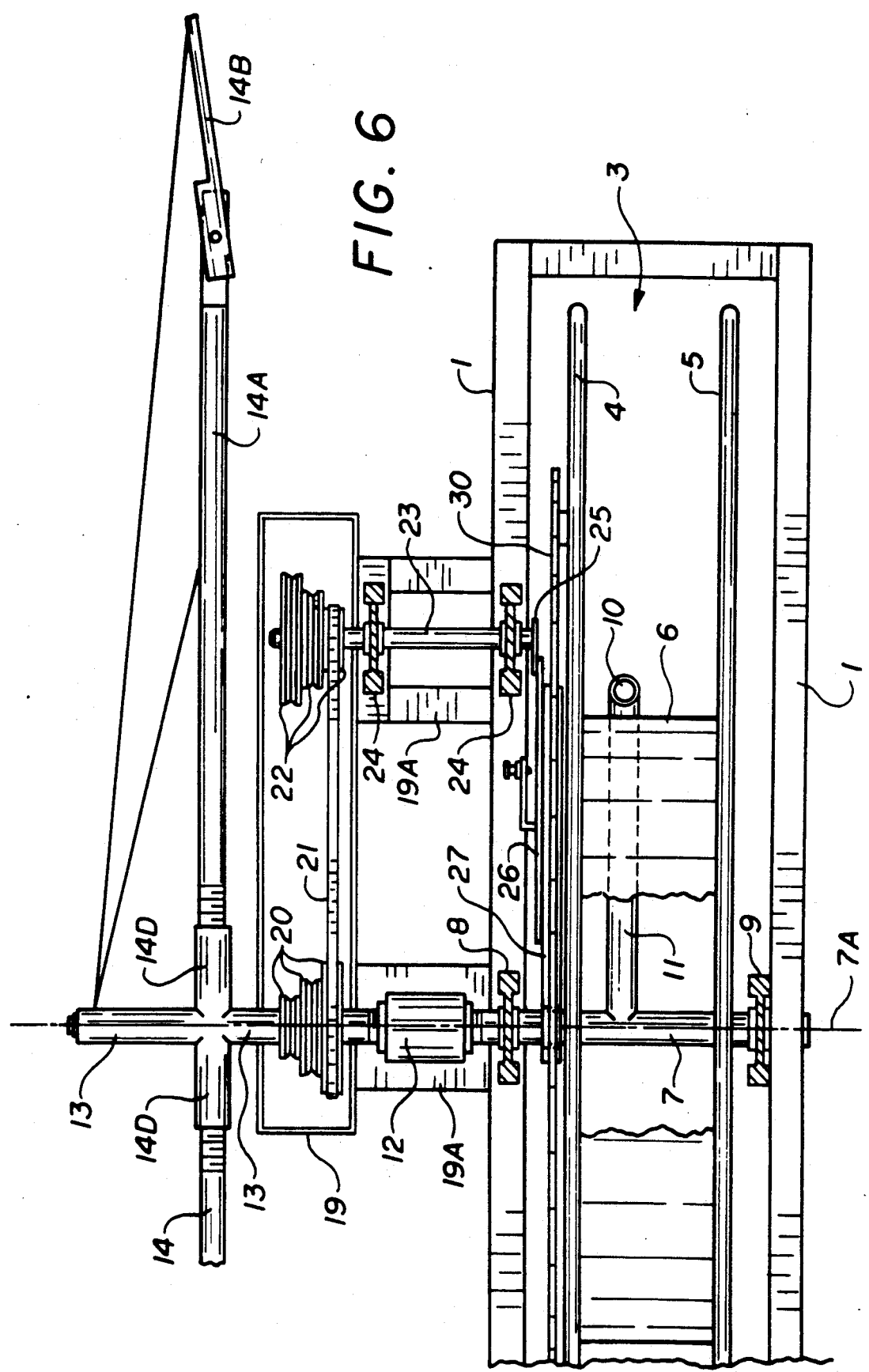

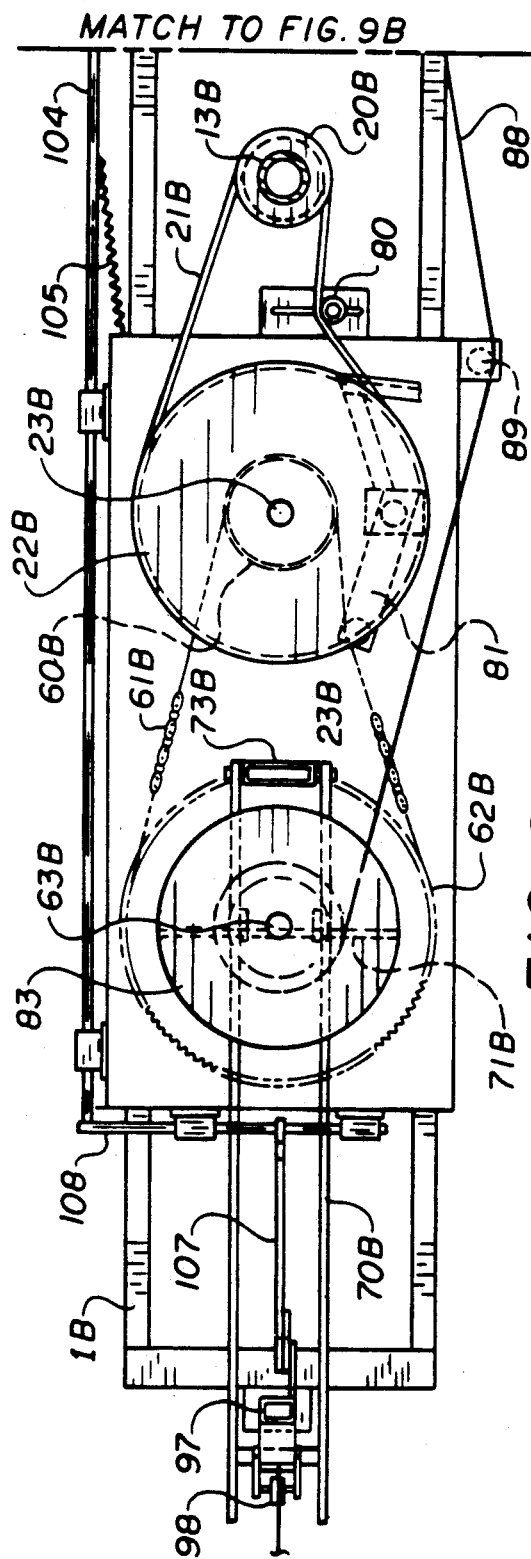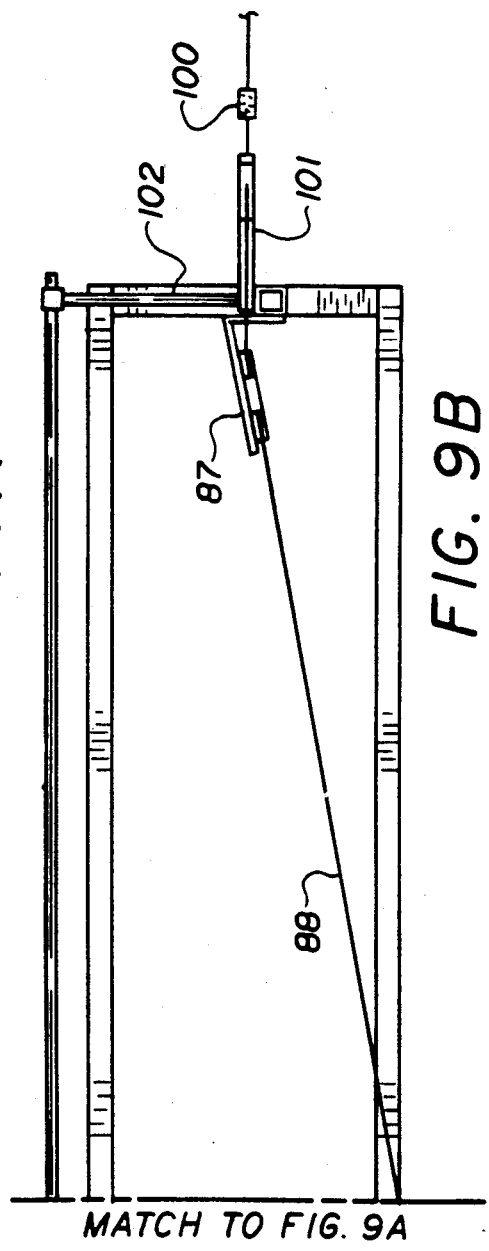

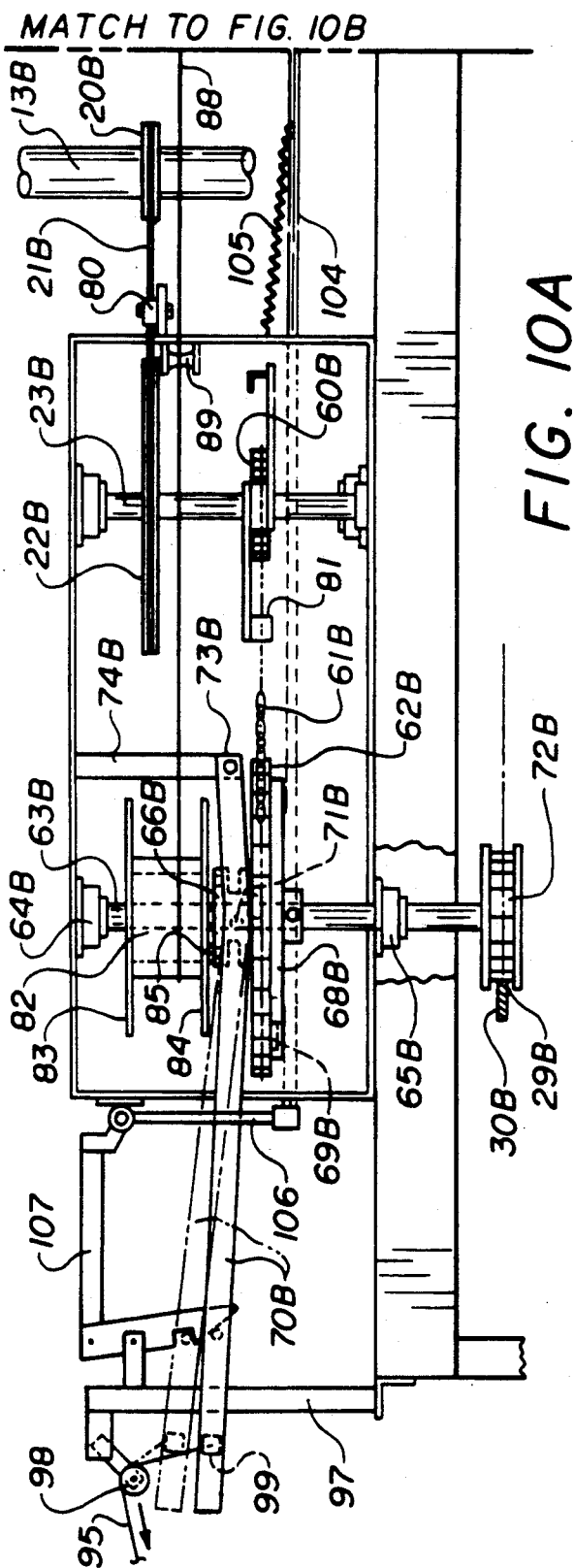

VEHICLE FOR DISTRIBUTING LIQUID OVER THE GROUND

This invention relates to a vehicle for distributing liquid over the ground.

According to the invention, there is provided a vehicle which is suitable for use in distributing a liquid over the ground, the vehicle comprising a chassis having a plurality of ground wheels; a rotatable reel, of which the axis of rotation is vertical or inclined to the vertical by no more than 30° and on to which part of a long length of hose may be wound; a rotatable rotor of which the axis of rotation is vertical or inclined to the vertical by no more than 30°; a liquid-discharging means carried by the rotor and communicating with the hose to receive liquid therefrom so as, in use, to cause rotation of the rotor as liquid is distributed over the ground; and a coupling for selectively providing drive between the rotor and the reel which comprises a geared mechanism which includes a selectively engageable/disengageable clutch means which can be actuated to couple/uncouple the drive between the rotor and the reel; the arrangement being such that, in use, with liquid supplied under pressure through the hose, the discharge of liquid through the liquid-discharging means causes rotation of the liquid-discharging means and of the rotor which in turn, when the drive between the rotor and the reel is coupled, causes rotation of the reel which takes up the hose and causes the vehicle to advance towards the remote end region of the hose without the need for any ground wheel to be driven.

The vehicle according to the present invention is stable and has a generally low profile because the reel for the hose is disposed with its axis of rotation vertical or not more than 30° from the vertical. The fact that water under pressure causes rotation of the rotor which, in turn, causes the reel to be rotated to take up the hose eliminates the need for any drive to a ground wheel of the vehicle. Furthermore, the fact that the hose, when paid out, extends in a generally straight line between the vehicle and a hydrant reduces the likelihood of damage to the crops being irrigated, as well as reducing the likelihood of damage to the hose itself as there is relatively little movement between the hose laid out on the ground and the ground itself.

The vehicle may, for example, be used in distributing dirty water over a field, in preference to discharging it directly into a river or other water course and polluting the water in it.

Preferably, when the drive from the rotor to the reel is coupled, the speed of rotation of the reel is less than the speed at which the rotor turns.

Conveniently the reel is rotated stepwise by a ratchet and pawl mechanism.

Conveniently the ratchet is provided by internal teeth on a ring fixed to or forming part of the reel.

Conveniently the pawl is mounted on an arm which is rotationally reciprocated by a link which is belt-driven from the rotor when the drive is coupled.

Preferably the vehicle includes means for retarding the travel over the ground of the vehicle.

Preferably the retarding means provides a nonuniform retarding effect.

Conveniently the retarding means includes a rotatable member provided with three or more radially disposed tines, any one or two of which can be in contact with the ground at any one time.

Preferably the reel has a hub, an upper flange and a lower flange, and wherein there is provided means tending to bias hose being fed onto the hub more towards the upper flange than the lower flange.

Conveniently the rotor includes two long arms, a hollow rotary shaft, for supporting the arms and for coupling to the hose so as to receive the liquid from it, and in which the liquid-discharging means comprises two short lengths of hose coupled to the shaft so as to receive the liquid from it, the short lengths of hose being carried by the long arms which rotate above the reel about a vertical or nearly vertical axis, the long arms being foldable so as to decrease the overall width of the vehicle when it is not in use.

Preferably, the axis of rotation of the reel and the axis of rotation of the rotor are coaxial. This makes for a particularly convenient arrangement.

With a view to providing for motion of the vehicle in the direction opposite to that when the hose is being taken up, the vehicle may also include a rotatable drum on to which part of a long length of cable may be wound; and a coupling between the rotor and the drum which comprises a geared mechanism which includes a selectively engageable/disengageable clutch means which can be actuated to couple/uncouple the drive between the rotor and the drum, whereby, in use, with the rotor rotating and with the drive between the rotor and the drum engaged, the consequent rotation of the drum causes the cable to be taken up by the drum and for the vehicle to advance towards the remote end region of the cable without the need for any ground when to be driven.

Preferably there is provision for disengagement of the drive between the rotor and the drum when the vehicle has reached a predetermined point on the cable being taken up by the drum.

Preferably there is provision to engage the clutch means between the rotor and the reel when the clutch means between the rotor and the drum are disengaged, and vice versa.

For a better understanding of the present invention and to show how the same may be carried into effect, reference will now be made, by way of example, to the accompanying drawings, in which:

FIG. 5 to 7 show elevations of parts of the vehicle;

Figure 11:
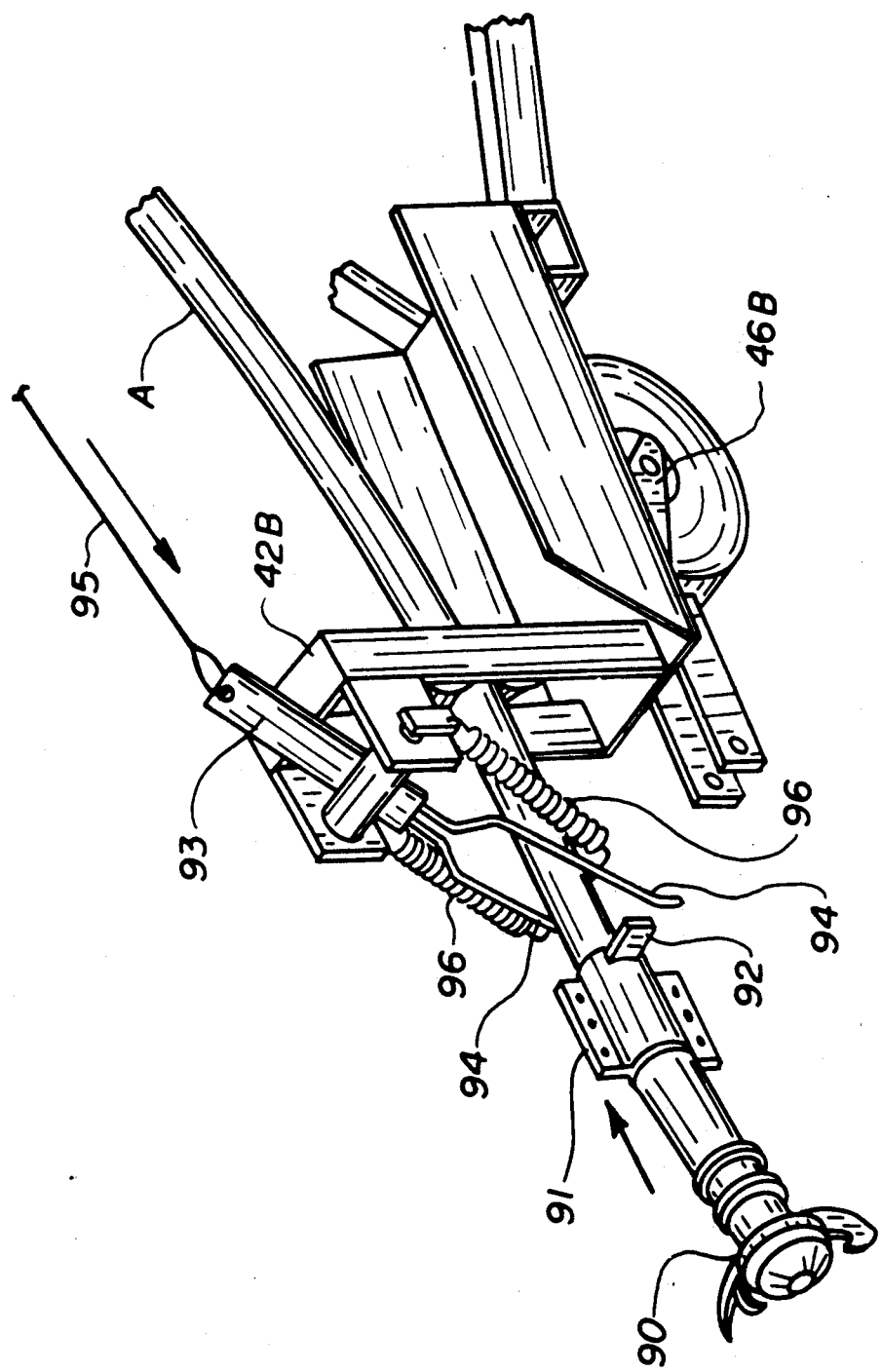

FIGS. 9a and 9b together are a plan view of certain components only of a third embodiment of vehicle in accordance with the present invention;

FIG. 10a and 10b together are a side elevation of the components shown in FIG. 9; and FIG. 11 is a perspective view of one end region of the vehicle of FIGS. 9 and 10.

Figure 1:
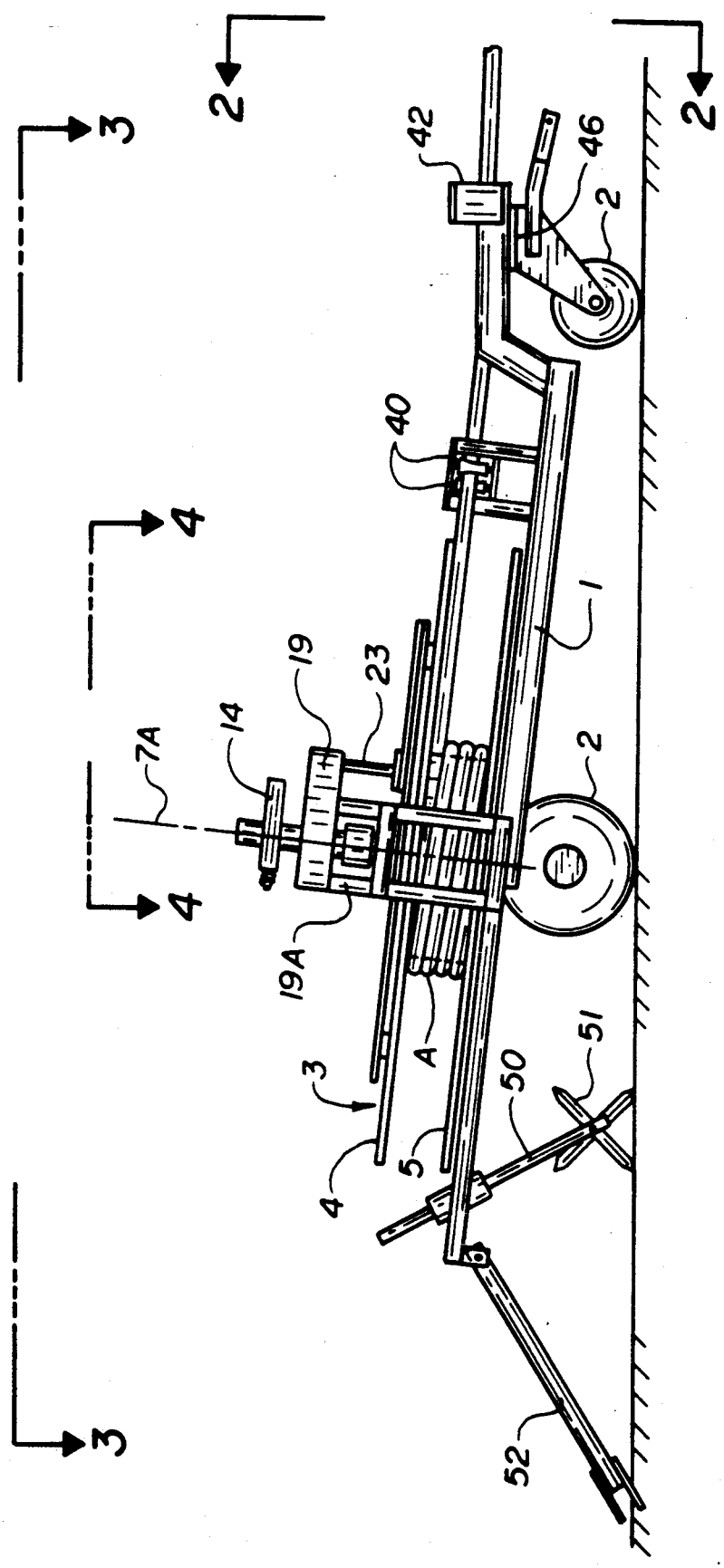
FIG. 1 shows a side elevation of one embodiment of a vehicle which is suitable for use in distributing dirty water over a field.

The vehicle illustrated has a chassis 1 on which three wheels 2 are mounted. A reel 3, having a hub 6 and upper and lower flanges 4 and 5, is mounted on the chassis and is fixed on a hollow axle 7 which runs in upper and lower bearings 8 and 9 mounted on the chassis 1, whereby the reel is able to rotate about an axis 7A which is inclined by a few degrees, less than 10°, to the vertical. One end of a long hose A, which is shown only in FIG. 1, is coupled to the hollow axis 7 through a hose connection 10 and a tube 11 in the hub 6.

Figure 2:
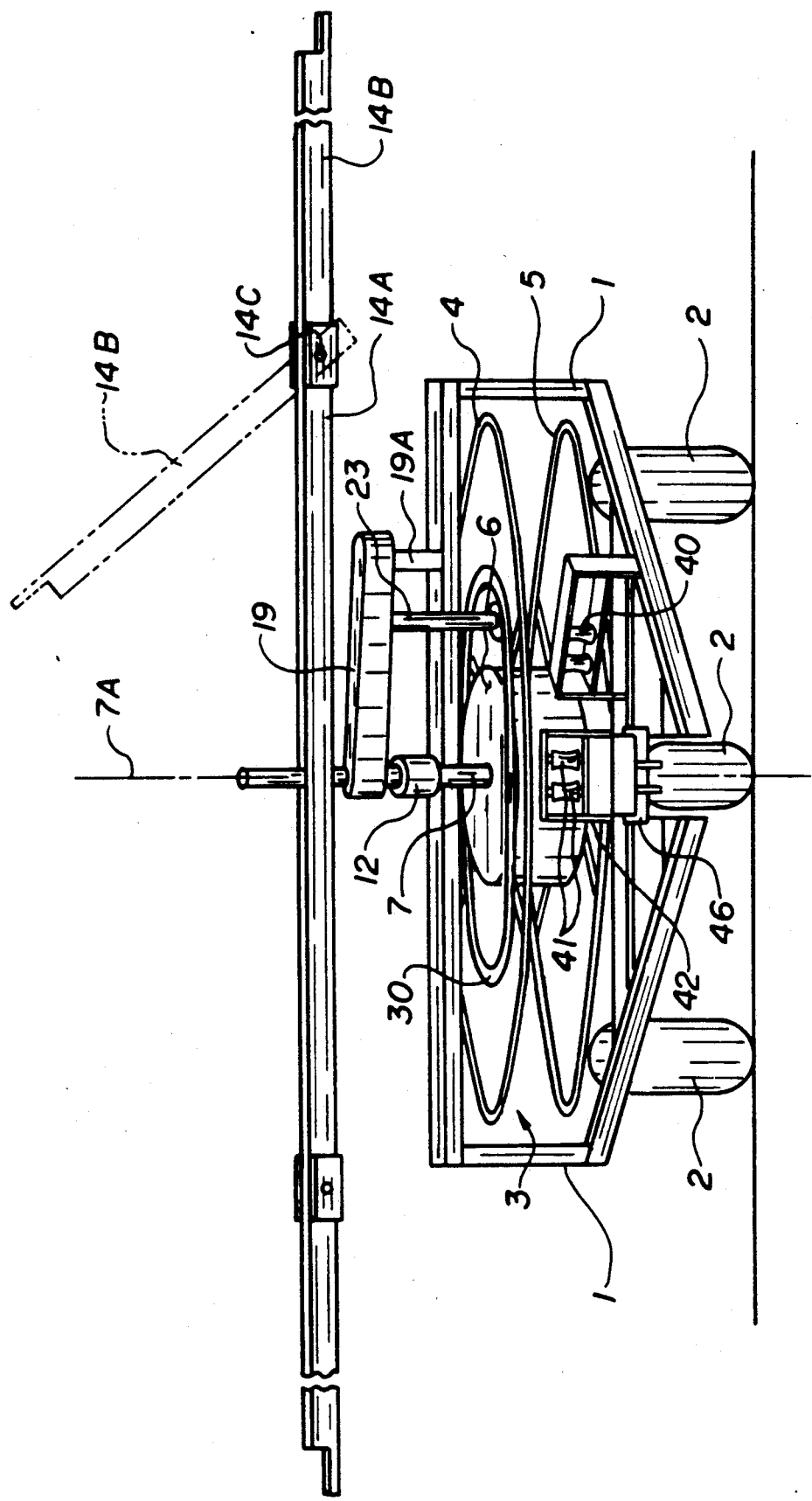
FIG. 2 shows an end elevation of the vehicle, as seen looking at the vehicle in the direction of the arrow II in FIG. 1.
Figure 3:
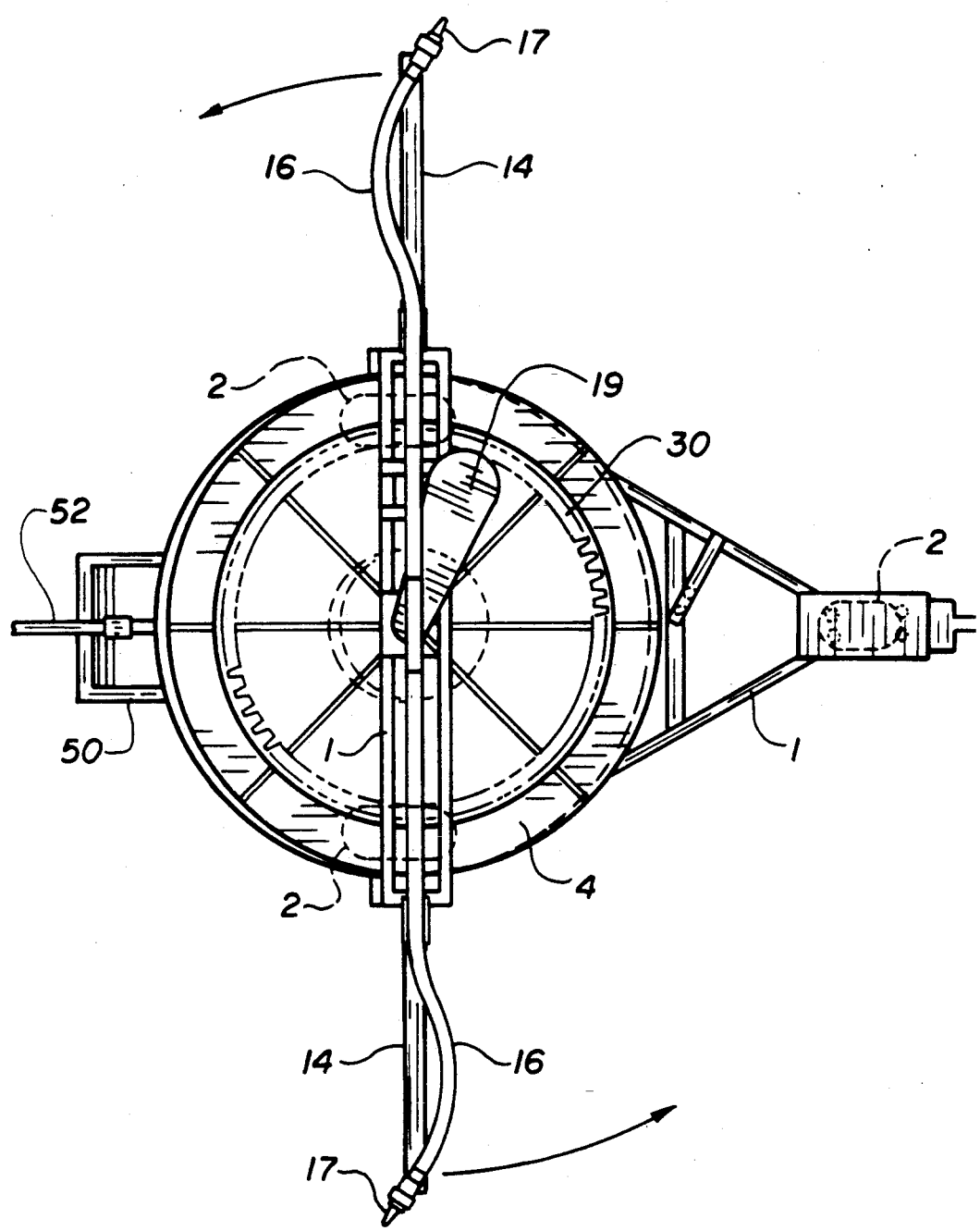
FIG. 3 shows a plan view of the vehicle taken as indicated by the arrow III in FIG. 1.
Figure 5:
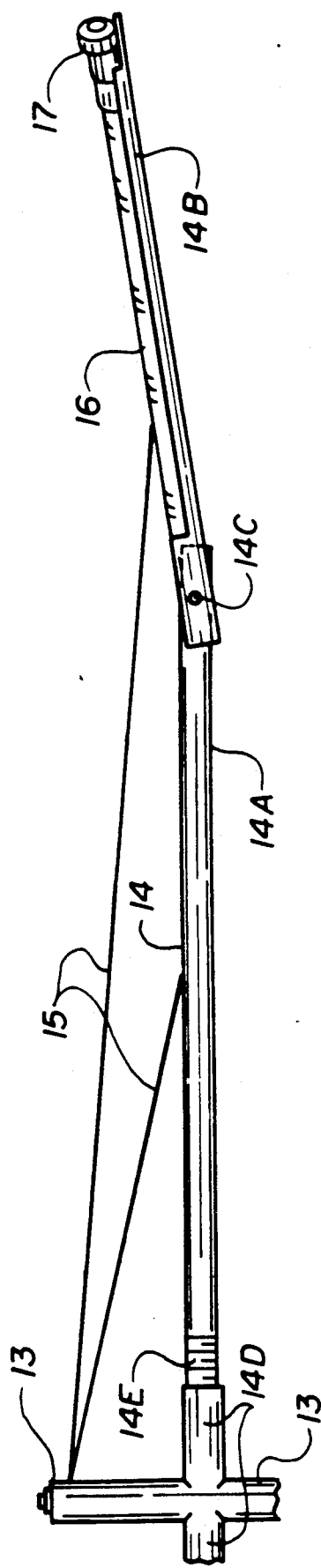

The hollow shaft 7 is closed at its lower end and its upper end communicates via a swivel coupling 12 with the lower end of a shaft 13, which also turns about the axis 7A and which supports two long arms 14 which project from it in opposite directions. The shaft 13 is hollow below the junction between the shaft 13 and the arms 14 but is not hollow above that junction. Each arm 14 consists of inner and outer parts 14A and 14B, respectively, which are pivotally connected together at 14C so that the arms can be folded, by the parts 14B being moved as shown by broken lines in FIG. 2, in order to make the vehicle narrower and more easy to move in confined spaces when not in use. Wires 15 support the arms from the top of the shaft 13. Each arm 14 has a short portion 14D which is made in one piece with the shaft 13 and has a screw-thread 14E enabling the coupling to the shaft 13 of a short hose 16—see FIGS. 3 and 5—carried by the arm. The hoses 16 terminate in nozzles 17 which are pivotally connected to the arms 14 and can be locked in any one of several positions, at differing angles of inclination to the arms. The nozzles may be made of rubber so that they may expand to allow solids in the water to pass through them.

When dirty water flows along the hose A, it passes through the hose connection 10, the axle 7, the coupling 12, the lower part of the shaft 13, the portions 14D of the arms, the hoses 16 and the nozzles 17 and is distributed over the ground. The water causes the arms 14 and the shaft 13 to rotate about the axis 7A at a speed which depends on, inter alia, the angle of inclination of the nozzles 17 with respect to the arms 14.

Figure 4:
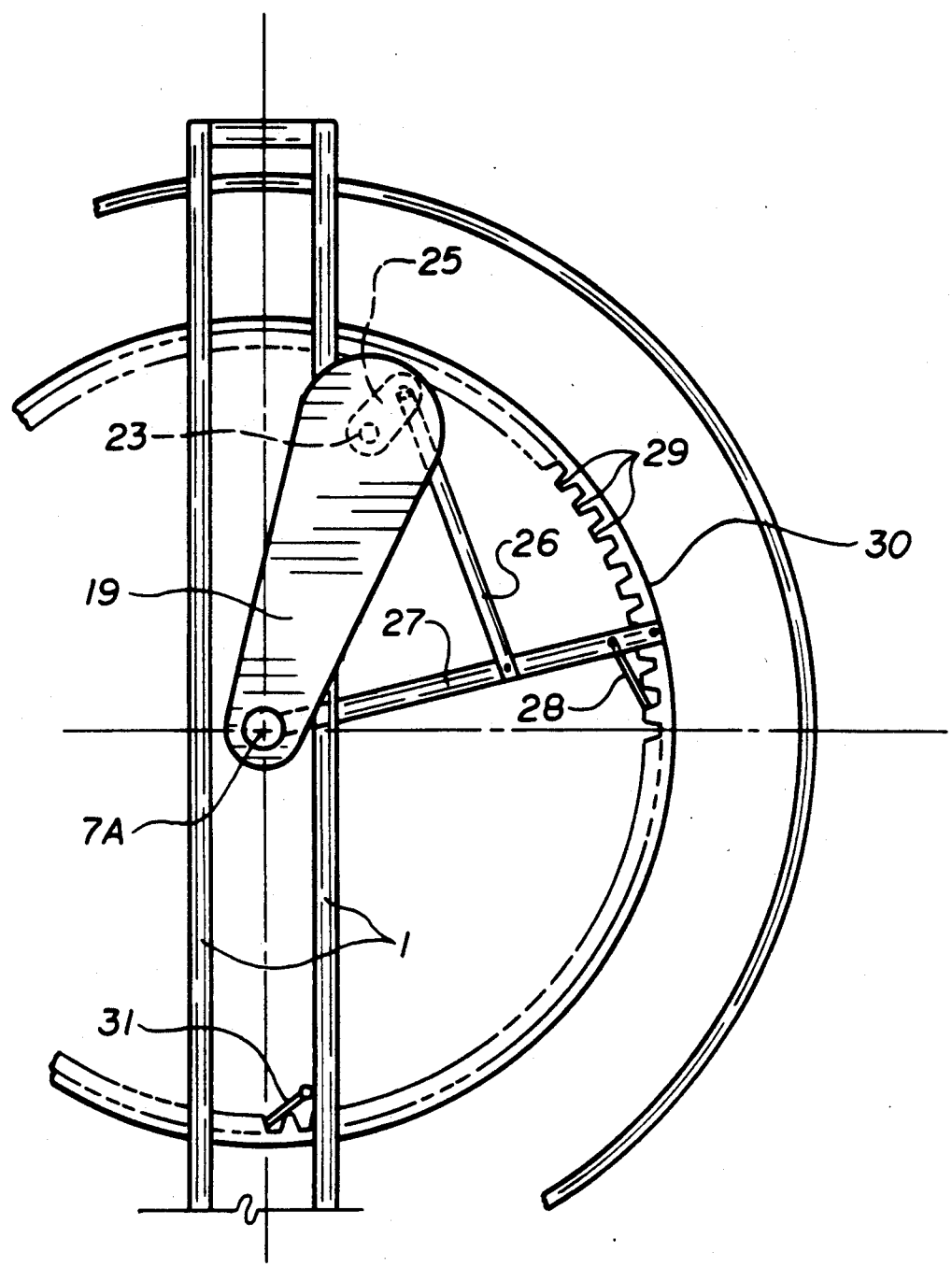
FIG. 4 shows a view, taken as indicated by the arrow IV in FIG. 1 of part of the vehicle.

The shaft 13 carries a set of three pulley wheels 20, any chosen one of which, depending on the transmission ratio desired, drives, through a belt 21, one of three pulley wheels 22 fixed on the upper end of a shaft 23 which runs in bearings 24 on the chassis 1. The parts 21 to 23 are surrounded by a casing 19 which is supported on the chassis 1 by two supports 19A. A link 25 has one end fixed on the shaft 23 and the other end pivotally connected to one end of a rod 26, the other end of which is pivotally connected to a rod 27 at a point spaced substantially from both its ends. One end of the rod 27 is mounted on the axle 7 so as to turn about it and the other end carries a pawl 28 which is urged to turn anticlockwise, considering FIG. 4, by a spring not shown. The pawl co-operates with a ratchet formed by teeth 29 on the inside of a ring 30 which is fixed to the upper flange 4 of the reel 3, although the ring could instead be part of the reel.

When the shaft 13 is turned by the water leaving the nozzles 17, the shaft 23 is driven, through the pulley wheels 20 and 22 and the belt 21, and the link 25 rotates about the axis of the shaft 23 and this causes the rod 27 to turn in opposite directions alternately about the axis 7A of the shaft 7. When the rod 27 turns clockwise, considering FIG. 4, the pawl 28 pushes the ring 30 round clockwise and when the rod 27 turns in the opposite direction the ring 30 does not turn because this is prevented by a latch 31. Thus the reel is caused to rotate stepwise at a speed very much lower than the speed at which the arms 14 turn. This rotation of the reel causes more of the hose A to become coiled around the hub 6 of the reel 3 which, as shown in FIG. 1, can accommodate a number of turns of the hose A in each of a number of layers.

The other end of the hose is connected to a distant hydrant and the hose lies on the ground in an approximately straight line from the hydrant to the vehicle. Rotation of the reel causes the vehicle to advance slowly, for example at 20 to 60 metres per hour, across the field towards the hydrant so that the water is distributed over a long and wide path radiating from the hydrant. The speed of travel depends on, inter alia, which pulley wheels 20 and 22 receive the belt 21. When the vehicle is near the hydrant, it can be pulled, by a tractor or manually, away from the hydrant along a different radial path, paying out more of the hose as it is pulled, until it has gone as far as desired and then the vehicle can be allowed to travel back along the same radial path towards the hydrant, distributing more water over the ground there.

The ring 30 can be uncoupled from the shaft 13 when desired by displacement of the pawl 28. Thus an actuating member may be mounted on the hose A at such a position that when the vehicle has travelled over the desired distance towards the hydrant the actuating member, as it moves between the flanges 4 and 5 of the reel 3, actuates a linkage which holds the pawl 28 clear of the ring 30. When the vehicle is being pulled away from the hydrant, the pawl 28 and the latch 31 are held out of engagement with the ring 30 by a short length of chain (not shown) on the chassis. At that stage the arms 14 may be folded if desired.

Figure 7:
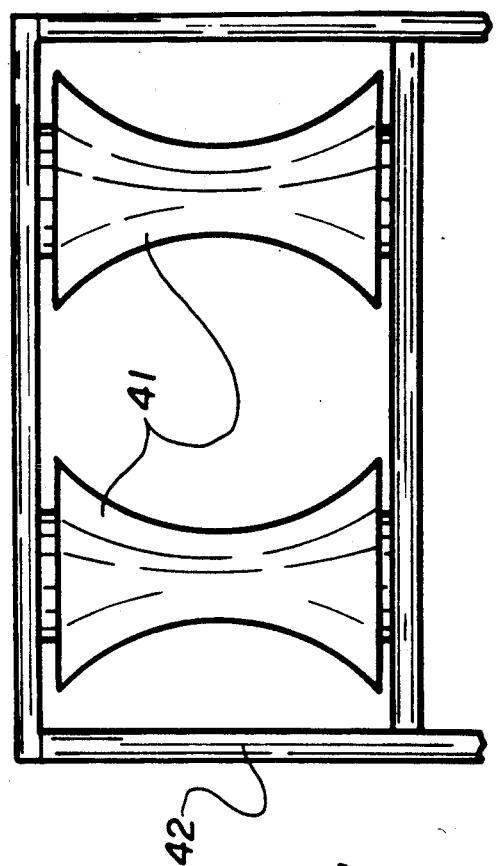

The hose is guided on to the reel by guide rollers 40 (FIG. 1) and 41 (FIG. 7), the latter being supported in a frame 42 (FIGS. 1 and 7). It is advantageous for the rollers 40 to be much nearer to the flange 4 than to the flange 5, thereby biasing the hose A towards an upper region of the hub 6. However, intermittent reductions in the tension of the hose, as provided by means explained below, allows the hose to start the next layer of the coil, whereby a neat coil is created on the hub 6 of the reel and the reel can accommodate a greater length of the hose than would be the case if the rollers 40 were lower.

In order to prevent the vehicle running downhill when used on a slope and also to provide a general retarding effect, there is provided an arm 50 on which there is mounted a rotor comprising a number, in this case four, of tines 51 welded together at right angles to one another. When two tines are engaging the ground, as shown in FIG. 1, often with slight penetration of the ground, the vehicle cannot run downhill but the resistance to motion of the vehicle can be overcome by the coiling of the hose on to the reel 3. The tines 51 turn through 90° only after the ring 30 has advanced several steps. As the vehicle advances, there is a slight reduction in the tension in the hose A, which helps with the neat coiling of the hose.

A tow-bar 52 is used to tow the vehicle away from the hydrant. When the vehicle is to travel towards the hydrant as described above, the tow bar 52 is left trailing on the ground as shown in FIG. 1 so that it further impedes unintended running of the vehicle downhill towards or away from the hydrant.

The wheel 2 shown to the right in FIG. 1 is fitted on a caster assembly 46 so that the vehicle is steered as it travels towards the hydrant. The tow-bar 52 can be uncoupled from the left-hand end (considering FIG. 1) of the vehicle and mounted on the caster assembly at the other end of the vehicle for towing the vehicle from field to field or along the road.

Because the flanges 4 and 5 of the reel 3 are horizontal or nearly so, the rotating arms 14, which of course must pass over the reel 3, can be low so that the profile of the vehicle as a whole is low and drift of sprayed water is minimised. When the arms 14 are folded, the flexible hose 16, which allows the folding of the arms, is folded also and the resultant kink in the hose prevents much water left in the hose from leaking through the nozzles.

The axis 7A could be inclined to the vertical by a greater angle than is shown in FIG. 1, for example up to about 30°.

If it is desired to use the vehicle as an irrigation machine, with clean water, the part of the shaft 13 which projects above the junction between the shaft 13 and the parts 14D of the arms 14 may be hollow and into its upper end there may be screwed an irrigation gun, so that clean water flows out of the nozzles 17 and the irrigation gun simultaneously.

Figure 8:
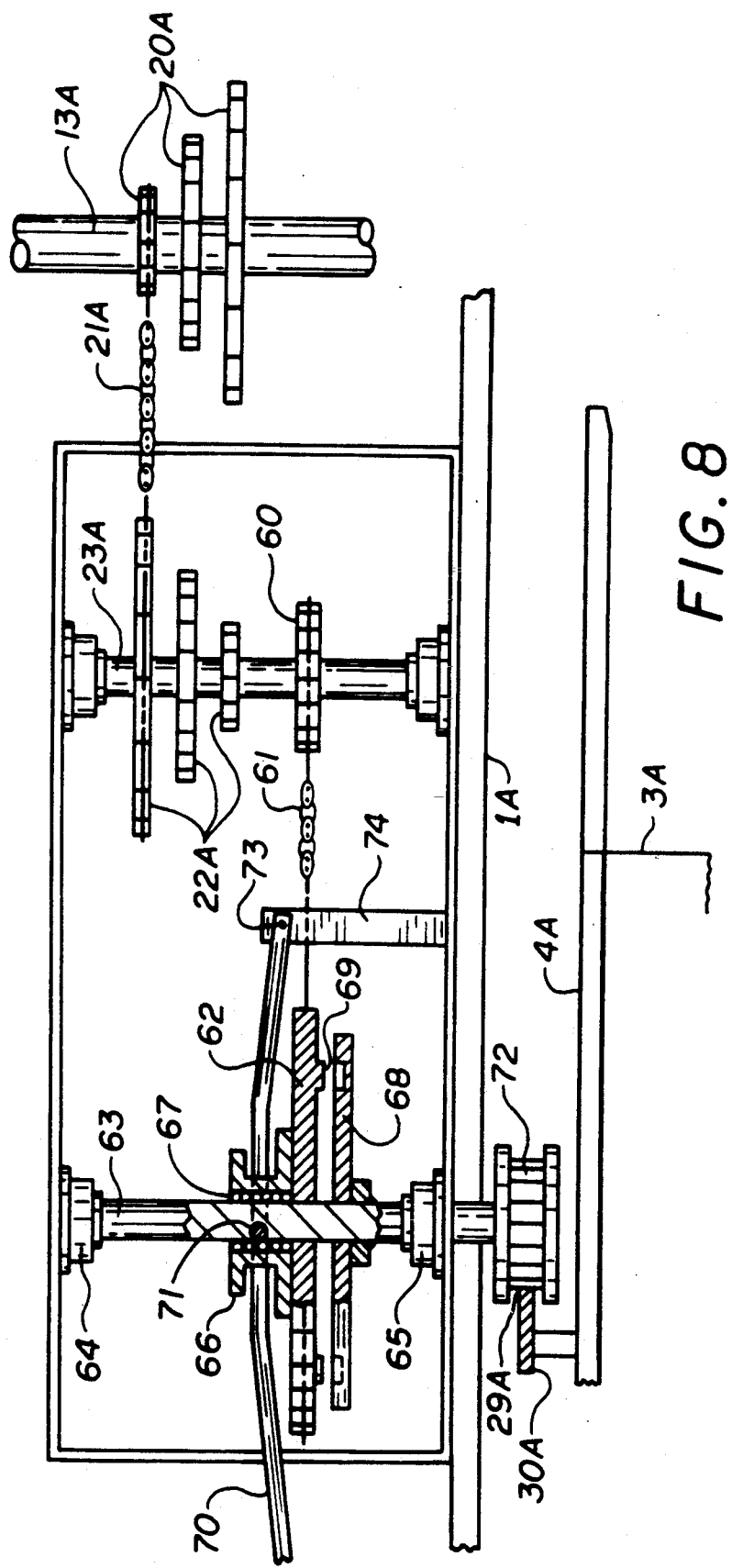
FIG. 8 is a vertical section through an alternative mechanism for causing rotation of the reel, which incorporates a selectively engaging/disengaging clutch means which can be actuated by the operator.

FIG. 8 shows an alternative arrangement to that described above for effecting the coupling between the rotor 13 and the reel 3.

In FIG. 8 the reference numerals which include "A" identify components identical to corresponding components illustrated in other figures of the drawings and identified by an identical reference numeral but without the "A".

As shown in FIG. 8, fixedly mounted on the shaft 13A are three sprocket wheels 20A (which could be pulleys) one of which engages a chain 21A (or belt) which engages with the corresponding sprocket (or pulley) out of a set of three sprockets 22A (or pulleys) fixedly mounted on the shaft 23A on which is fixedly mounted a sprocket 60 which drives a chain 61 which, in turn, drives a sprocket 62 freely rotatable on, and axially movable along, an axle 63 which is freely rotatable within upper and lower bearings 64 and 65 secured with respect to the chassis 1A.

Fixedly secured to the sprocket 62 is a bush 66 which, like the sprocket 62, is freely movable in the axially direction along the axle 63. There is a bearing arrangement 67 to assist relative movement between the bush 66 and sprocket 62 on the one hand, and the axle 63 on the other hand.

Positioned below the sprocket 62 and fixedly secured to the axle 63 is a fixed plate 68 the upper surface of which is provided with recesses capable of receiving teeth 69 projecting downwardly from the underside of the sprocket 62, the arrangement being such that when the sprocket 62 is in a relatively upper position the sprocket 62 can rotate without the teeth 69 engaging the recesses in the fixed plate 68 but, when the sprocket 62 is in a relatively lower position, the teeth 69 engage the recesses in plate 68 and consequently rotation of the sprocket 62 causes rotation of the fixed plate 68 and hence rotation of the axle 63.

At the lower end region of the axle 63 is fixedly mounted a sprocket 72 whose teeth can engage the teeth 29A on the inner surface of the ring 30A. Thus when the teeth 69 on the sprocket 62 engage the recesses in the fixed plate 68, and when rotation of the shaft 13A causes rotation of the sprocket 20A, movement of the chain 21A, rotation of the sprocket 22A, rotation of the shaft 23A, rotation of the sprocket 60, movement of the chain 61, and rotation of the sprocket 62, there is corresponding rotation of the plate 68, rotation of the axle 63, rotation of the sprocket 72, and rotation of the reel 3A as a result of the drive between the sprocket 72 and the teeth 29A on the ring wheel 30A attached to the upper frame 4A of the reel 3A.

Control of the sprocket 62 with respect to the axle 63 is effected by a clutch lever 70 which is provided with a roller bearing 71 which engages in the groove of the bush 66 such that upward or downward movement of the clutch lever 70 causes upward and downward movement of the roller bearing 71 and hence upward and downward movement of the bush 66 and of the sprocket 62, the clutch lever 70 being mounted pivotally at its inboard end 73 on a suitable post 74.

In the arrangement illustrated in FIG. 8, what is important is for there to be the ability for the sprocket 62 to rotate freely upon the axle 63. In the arrangement illustrated it is the sprocket 62 which is caused to move upwardly and downwardly to the axle 63, but in a variant the sprocket 62 could be maintained at the same height and the plate 68 could be caused to move upwardly or downwardly if it were mounted on splines in relation to the axle 63—this variant is not so strongly favoured because of the known tendency of splines to "bind".

With regard to the arrangement illustrated in FIG. 8 the advancement of the vehicle relative to the ground simply requires operation of the clutch lever 70 so as to engage the drive between the sprocket 62 and the plate 68 which will cause rotation of the reel 3A and hence advancement of the vehicle.

FIGS. 9, 10 and 11 show an arrangement similar to that in FIG. 8, but with provision for effecting coupling between the rotor and a drum for taking up a cable (which could be a wire) to cause the vehicle to advance in the direction opposite to that in which it advances when the reel is taking up the hose.

In FIG. 9, 10 and 11 the reference numerals which include "B" identify components identical or substantially identical to corresponding components illustrated in other figures of the drawings and identified by an identical reference numeral but without the "B".

As shown in FIGS. 9 and 10, fixedly mounted on the shaft 13B is a sprocket wheel 20B (which could be a pulley) which engages a chain 21B (or belt) which passes a tensioner 80 and engages with the corresponding sprocket (or pulley) 22B fixedly mounted on the shaft 23B on which is fixedly mounted a sprocket 60B which drives a chain 61B which, in turn, passes via a tensioner 81 and drives a sprocket 62B freely rotatable on, and axially movable along, an axle 63B which is freely rotatable within upper and lower bearings 64B and 65B secured with respect to the chassis 1B.

Fixedly secured to the sprocket 62B is a bush 66B which, like the sprocket 62B, is freely movable in the axially direction along the axle 63B. There is a bearing arrangement (not shown) to assist relative movement between the bush 66B and sprocket 62B on the one hand, and the axle 63B on the other hand.

Positioned below the sprocket 62B and fixedly secured to the axle 63B is a fixed plate 68B the upper surface of which is provided with recesses (not shown) capable of receiving teeth 69B projecting downwardly from the underside of the sprocket 62B, the arrangement being such that when the sprocket 62B is in a relatively upper position the sprocket 62B can rotate without the teeth 69B engaging the recesses in the fixed plate 68B but, when the sprocket 62B is in a relatively lower position, the teeth 69B engage the recesses in plate 68B and consequently rotation of the sprocket 62 causes rotation of the fixed plate 68B and hence rotation of the axle 63B.

At the lower end region of the axle 63B is fixedly mounted a sprocket 72B whose teeth can engage the teeth 29B on the inner surface of the ring 30B. Thus when the teeth 69B on the sprocket 62B engage the recesses in the fixed plate 68B, and when rotation of the shaft 13B causes rotation of the sprocket 20B, movement of the chain 21B, rotation of the sprocket 22B, rotation of the shaft 23B, rotation of the sprocket 60B, movement of the chain 61B, and rotation of the sprocket 62B, there is corresponding rotation of the plate 68B, rotation of the axle 63B, rotation of the sprocket 72B, and rotation of the reel 3B as a result of the drive between the sprocket 72B and the teeth 29B on the ring wheel 30B attached to the upper frame 4B of the reel 3B.

Control of the sprocket 62B with respect to the axle 63B is effected by a clutch lever 70B which is provided with a roller bearing 71B which engages in the groove of the bush 66B such that upward or downward movement of the clutch lever 70B causes upward and downward movement of the roller bearing 71B and hence upward and downward movement of the bush 66B and of the sprocket 62B, the clutch lever 70B being mounted pivotally at its inboard end 73B on a suitable post 74B.

In the arrangement illustrated in FIG. 8B, what is important is for there to be the ability for the sprocket 62B to rotate freely upon the axle 63B. In the arrangement illustrated it is the sprocket 62B which is caused to move upwardly and downwardly relative to the axle 63B.

With regard to the arrangement illustrated in FIGS. 9, 10 and 11 the advancement of the vehicle relative to the ground in the direction of the hose simply requires operation of the clutch lever 70B so as to engage the drive between the sprocket 62B and the plate 68B which will cause rotation of the reel and hence advancement of the vehicle.

There will now be described some of the additional equipment on the vehicle shown in FIGS. 9, 10 and 11, which is concerned with means for causing the vehicle to be advanced over the ground in a direction opposite to that in which the vehicle advances when the reel is taking up hose from the ground.

Fixedly mounted on the axle 63B above the bush 66B is also a drum 82 having an upper flange 83 and a lower flange 84 which is provided with downwardly directed teeth 85 capable of engaging recesses (not shown) in the upper surface of the bush 66B when the bush 66B is in its upper position, in terms of its vertical movement relative to the axle 63B.

At the right hand end (in FIGS. 9 and 10) of the chassis 1B is a post 86 which carries a cable guide 87 which directs the cable 88 to a guide pulley 89 and from there to the drum 82.

When the lever 70B is moved into its upward position the bush 66B is caused to move upwards and the teeth 85 on the lower flange 84 of the drum 82 engage in recesses in the bush 66B with the result that the rotating bush 66B causes rotation of the drum 82 which causes the cable 88 to be taken up and for the vehicle to advance to the right (in FIGS. 9 and 10).

The distal end region (not shown) of the cable is secured to a stake (also not shown) which is driven into the ground at a point lying on the line of desired direction of travel of the vehicle. Thus, with the hydrant in the centre of the field, and with the hose attached to the hydrant, the vehicle can follow the hose towards the hydrant while the clutch lever 70B is in the lower position. Once there, the clutch lever 70B can be moved manually or otherwise to the upper position so that the rotor 13B is coupled to the drum 82 and the vehicle advances in the opposite direction along the line of the cable. Incidentally, while the vehicle is advancing to the hydrant, the stake to which the cable is secured could be re-positioned so that, as the vehicle advances along the cable, it can follow a new route.

Although, as indicated above, the clutch lever 70B can be moved from its upper to its lower position, and vice versa, manually, the embodiment illustrated in FIGS. 8 and 10 contains further equipment capable of automatically causing movement of the clutch lever 70B when the vehicle is nearly at the hydrant at one end of its travel or nearly at the stake when the vehicle is at the opposite end of its travel.

There will now be described, with reference to FIG. 11 in particular, equipment for automatically causing the lever 70B to be raised to its upper position, as the vehicle approaches to hydrant, so as to cause the rotor 13B to be uncoupled from the hose reel. At the hydrant end of the hose A is a coupling for coupling to the hydrant. Mounted securely on the hose A near the coupling 90 is a sleeve 91 with projecting arms 92. Mounted on the frame 42B at one end of the vehicle is a pivotally mounted element 93 which is bifurcated at its lower region with two arms 94 straddling the hose A and capable of contact with the arms 92 on the sleeve 91. At its upper end region the element 93 is secured to a wire 95. The element 93 is urged clockwise as viewed in FIG. 11 by a spring 96. Movement of the vehicle along the hose A towards the hydrant coupling 90, causes the arms 94 to abut the arms 92 and to cause the element 93 to pivot anticlockwise (as viewed in FIG. 11) against the action of the spring 96, thus causing the wire 95 to move to the left. Mounted on the leading end region of the vehicle is a post 97 on which is a pulley 98, the wire 95 passing over the pulley 98 and being secured to a free end region 99 of the clutch lever 70B. Movement of the wire 95 in the direction shown by the arrow in FIG. 10 causes the lever 70B to be moved upwards so as to cause the bush 66B to be moved upwards to disengage drive to the plate 68B and to engage drive to the drum 82.

For causing movement of the clutch lever 70B in the opposite direction when the vehicle has reached the opposite end of its travel the following extra equipment is provided.

The cable 88 is provided with a block 100 near the stake. Pivotally mounted on the post 86 is an arm 101 through a hole in which the cable passes. The arm is fixed to a rod 102 on which is fixedly mounted another arm 103 pivotally linked to a rod 104. It will be appreciated that the action of the block 100 engaging the arm 101 causes the arm 101 to rotate anti-clockwise as viewed in FIG. 10. This causes the rod 102 to twist anti-clockwise and the lower end of the arm 103 to move to the right (in FIG. 10), with the result that the rod 104 also moves to the right, against the action of a tension spring 105. At its left hand the rod 104 is pivotally connected to a rod 106 which is rigidly secured to an arm 107 via a rod 108, with provision for pivotal movement of the combination of the rod 106 and arm 107 about the axis of rod 108. At the opposite end of rod 107 is a bracket 109 with a slot 110 in which is located a pin 111 associated with the lever 70B. Anti-clockwise pivoting of arm 107 about the axis of rod 108 causes depression of the bracket 109 and hence the slot 110 and pin 101 and downward movement of the lever 70B. This causes the bush 66B to disengage from the cable drum 82, and for the sprocket 62B to engage the plate 68B.

I claim:

1. A vehicle which is suitable for use in distributing a liquid over the ground, the vehicle comprising a chassis having a plurality of ground wheels; a rotatable reel, of which the axis of rotation is inclined to the vertical by no more than 30° and on to which part of a long length of hose may be wound; a rotatable rotor of which the axis of rotation is inclined to the vertical by no more than 30°; a liquid-discharging means carried by the rotor and communicating with the hose to receive liquid therefrom so as, in use, to cause rotation of the rotor as liquid is distributed over the ground; and a coupling for selectively providing drive between the rotor and the reel which comprises a geared mechanism which includes a selectively engageable/disengageable clutch means which can be actuated to couple/uncouple the drive between the rotor and the reel; the arrangement being such that, in use, with liquid supplied under pressure through the hose, the discharge of liquid through the liquid-discharging means causes rotation of the liquid-discharging means and of the rotor which in turn, when the drive between the rotor and the reel is coupled, causes rotation of the reel which takes up the hose and causes the vehicle to advance towards the remote end region of the hose without the need for any ground wheel to be driven.

2. A vehicle according to claim 1, in which, when the drive from the rotor of the reel is coupled, the speed of rotation of the reel is less than the speed at which the rotor turns.

3. A vehicle according to claim 1, in which the reel is rotated stepwise by a ratchet and pawl mechanism.

4. A vehicle according to claim 3, in which the ratchet is provided by internal teeth on a ring associated with the reel.

5. A vehicle according to claim 3, in which the pawl is mounted on an arm which is rotationally reciprocated by a link which is belt-driven from the rotor when the drive is coupled.

6. A vehicle according to claim 1, which includes provision to disengage the clutch means when the vehicle has reached a predetermined point on the hose being taken up by the reel.

7. A vehicle according to claim 1, which includes means for retarding the travel over the ground of the vehicle.

8. A vehicle according to claim 7, wherein the retarding means provides a non-uniform retarding effect.

9. A vehicle according to claim 7, wherein the retarding means includes a rotatable member provided with at least three radially disposed tines, at least one of which can be in contact with the ground at any one time.

10. A vehicle according to claim 1, wherein the reel has a hub, an upper flange and a lower flange, and wherein there is provided means tending to bias hose being fed onto the hub more towards the upper flange than the lower flange.

11. A vehicle according to claim 1, in which the rotor includes two long arms, a hollow rotary shaft for supporting the arms and for coupling to the hose so as the receive the liquid from it, and in which the liquid-discharging means comprises two short lengths of hose coupled to the shaft so as to receive the liquid from it, the short lengths of hose being carried by the long arms which rotate above the reel about a nearly vertical axis, the log arms being foldable so as to decrease the overall width of the vehicle when it is not in use.

12. A vehicle according to claim 1, wherein the axis of rotation of the reel and the axis of rotation of the rotor are coaxial.

13. A vehicle according to claim 1, which also includes a rotatable drum on to which part of a long length of cable may be wound; and a coupling between the rotor and the drum which comprises a geared mechanism which includes a selectively engageable/disengageable clutch means which can be actuated to couple/uncouple the drive between the rotor and the drum, whereby, in use, with the rotor rotating and with the drive between the rotor and the drum engaged, the consequent rotation of the drum causes the cable to be taken up by the drum and for the vehicle to advance towards the remote end region of the cable without the need for any ground wheel to be driven.

14. A vehicle according to claim 13, which also includes provision for disengagement of the drive between the rotor and the drum when the vehicle has reached a predetermined point on the cable being taken up by the drum.

15. A vehicle according to claim 13, which includes provision to engage the clutch means between the rotor and the reel when the clutch means between the rotor and the drum are disengaged, and vice versa.

* * * * *